United States Patent

Wirtjes et al.

[11] Patent Number: 5,774,786
[45] Date of Patent: Jun. 30, 1998

[54] METHOD OF MAINTAINING CALLS SUBSEQUENT TO A SITE CONTROLLER FAILURE

[75] Inventors: Michael L. Wirtjes, Lake in the Hills; Kristin C. Cramer, Island Lake, both of Ill.

[73] Assignee: Motorola, Inc., Schaumburg, Ill.

[21] Appl. No.: 550,584

[22] Filed: Oct. 31, 1995

[51] Int. Cl.⁶ .................................................... H04B 7/14
[52] U.S. Cl. ................................ 455/8; 455/11.1; 455/9; 455/507; 455/517; 370/226; 395/182.02
[58] Field of Search ..................... 455/8, 9, 11.1, 455/14–17, 507, 514, 515, 517–520, 524–525, 500, 422–424, 67.1, 68, 186.1, 100, 106, 113–115; 395/182.02, 182.09, 182.1, 182.11; 370/221, 226, 328, 310, 315, 327, 340

[56] References Cited

U.S. PATENT DOCUMENTS

| 4,723,264 | 2/1988 | Sasuta et al. | 455/518 |
| 5,021,938 | 6/1991 | Hayakawa | 395/182.11 |
| 5,513,378 | 4/1996 | Ranz et al. | 455/8 |
| 5,594,942 | 1/1997 | Antic et al. | 455/8 |

*Primary Examiner*—Reinhard J. Eisenzopf
*Assistant Examiner*—Doris To
*Attorney, Agent, or Firm*—Susan L. Lukasik

[57] ABSTRACT

The present invention provides a method of maintaining calls subsequent to a site controller failure. A site controller broadcasts call information to a plurality of standby repeaters. The standby repeaters receive the call information, build a call table including the call information, and utilize the call information to maintain calls in the event of a site controller failure.

10 Claims, 1 Drawing Sheet

METHOD OF MAINTAINING CALLS SUBSEQUENT TO A SITE CONTROLLER FAILURE

FIELD OF THE INVENTION

This invention relates generally to communication systems, and in particular, to a method of maintaining calls within a communication system subsequent to a site controller failure.

BACKGROUND OF THE INVENTION

A trunked communication system utilizes a site controller to manage resources and to process calls at the system. In order to maintain ongoing calls, the site controller needs to know which repeaters are engaged in calls, the types of calls ongoing, which resources the repeaters are using, and so forth.

When a site controller goes out-of-service, due to hardware failure or the like, a repeater other than the out-of-service site controller must take over responsibility as the site controller. In order to effectively perform the duties of the site controller, the repeater must ascertain call information for all repeaters at the site. In current systems, this is accomplished by broadcasting to all repeaters at the site a message requesting each repeater to send current call information for each repeater.

In systems having a large number of networked repeaters, however, these messages can inundate the Local Area Network (LAN) with messages. This flood of messages can prevent other, sometimes vital, messages from being properly sent and received. Consequently, communication between repeaters can be interrupted or delayed.

Therefore, there exists a need for a method to maintain calls upon a site controller failure on repeaters in a communication system without negatively affecting the LAN upon assignment of a new site controller.

DETAILED DESCRIPTION OF A PREFERRED EMBODIMENT

The present invention provides a method of maintaining calls subsequent to a site controller failure. The method is carried out at distinct members of the communication system. The site controller, which in a preferred embodiment is responsible for resource management and call processing, broadcasts, via a Local Area Network (LAN), call information relating to ongoing calls at the communication system. In a preferred embodiment, as calls begin, the site controller sends the call information to all other repeaters connected on the LAN. These repeaters, known as standby repeaters, add the call information to a call table maintained on each standby repeater. In this manner, the standby repeaters are aware of the call information relating to all other repeaters at the site. When the site controller fails, one of the standby repeaters takes over as the new site controller. The new site controller utilizes the information contained in the call table to maintain calls at the communication system, without the need for excessive communications on the LAN, which could adversely affect system operations.

Figure 1:
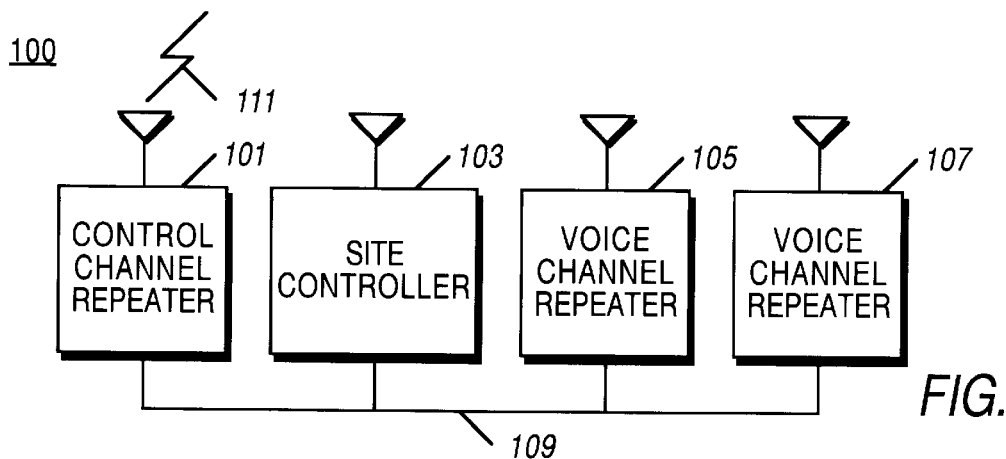
FIG. 1 is a block diagram of a trunked communication system configured in accordance with a preferred embodiment of the present invention.

The present invention can be better understood with reference to FIGS. 1–4. FIG. 1 shows details of a communication system (100), such as a trunked communication system, in accordance with a preferred embodiment of the present invention. The trunked communication system (100) includes a plurality of repeaters (101, 103, 105, and 107), such as those sold under the trade name IntelliRepeater™ by Motorola, Inc., operably connected via a LAN (109). In the preferred embodiment, the LAN (109) is an AppleTalk network. In an alternate embodiment, the LAN (109) consists of an EtherNet connection. Control and resource information is passed across the LAN (109) between repeaters (101, 103, 105, and 107) within the trunked communication system (100).

In the preferred embodiment, one repeater will perform duties of the control channel repeater. For matters of illustration, the repeater designated by reference numeral 101 will be considered such a control channel repeater. The control channel repeater (101) receives over-the-air control information (111) from a plurality of subscriber units, not shown. When a subscriber unit desires to make a call, such as a dispatch call, a private call, or an emergency call, the subscriber unit sends an Inbound Signaling Word (ISW) to the control channel repeater (101). The control channel repeater (101) forwards this request to the site controller (103), sometimes referred to as the active master, which processes the call request. All subsequent call controlling information sent between the site controller (103) and the repeater assigned for the call is broadcast across the LAN to all standby repeaters at the site. Standby repeaters are those repeaters that are capable of performing the duties of the site controller but are currently not performing as the site controller. Each standby repeater, upon receiving any call-related information, inserts the call information into a call table. In this manner, in the event the site controller (103) is unable to continue as the site controller, i.e., it goes out of service or is disconnected from the LAN, a new site controller is assigned from among the plurality of standby repeaters. Because the newly assigned repeater has built its own call table, there is no need to require the call table to be rebuilt.

Figure 2:
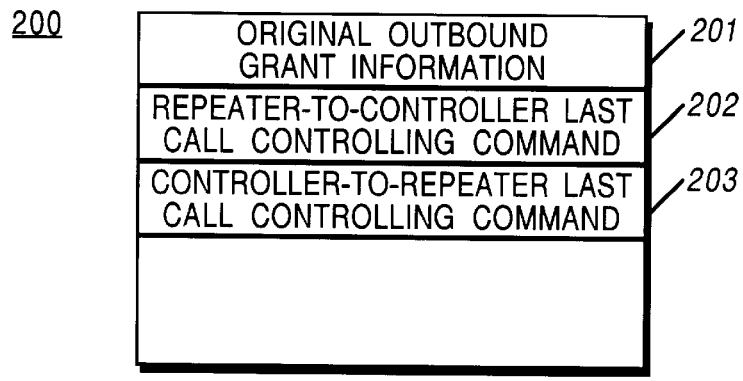
FIG. 2 is a call record in accordance with the preferred embodiment of the present invention.

FIG. 2 depicts the necessary information contained in one record (200) in the call table. It is understood that the invention is not limited to the information presented, and that each repeater in a communication system will have a corresponding record (200) in the call table. The call record (200) includes the original outbound grant information (201) for a particular call on a particular repeater, the repeater-to-controller last call controlling command (202) sent by a particular repeater to the site controller, and the controller-to-repeater last call controlling command (203) sent by the site controller to a particular repeater. The original outbound grant information (201) is used to determine identification of the individual and the talkgroup as well as the call type for the call. The repeater-to-controller last call controlling command (202) and the controller-to-repeater last call controlling command (203) are used to determine the assignment state and phase of a call. For example, when the last command sent from the site controller to a particular repeater was a command to unmute, and the last command sent from a particular repeater to the site controller was that the subscriber unit has been detected, the assignment state of the particular repeater is assigned and the call phase is considered active and ongoing.

Figure 3:
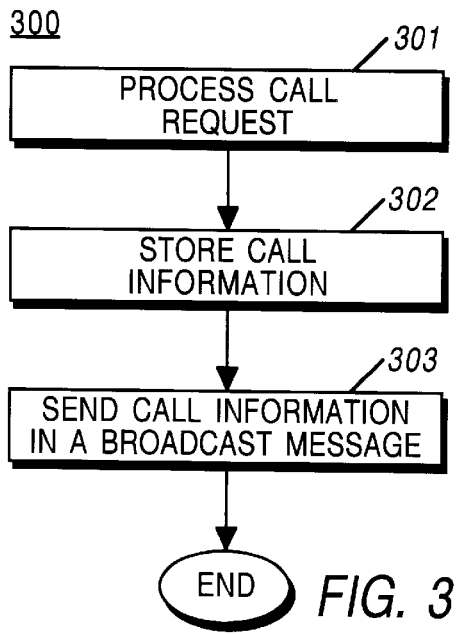
FIG. 3 is a flow diagram depicting operation of a site controller in accordance with the preferred embodiment of the present invention.

FIG. 3 represents the processing (300) that a site controller goes through when processing calls at a communication system. When a call request is received, the site controller processes (301) the call request. This processing involves determining whether there are resources available for the call, which repeater is the best choice to be assigned with this call request, and so forth. The call information for the call is stored (302) in a call table, such as the call table described in FIG. 2. The site controller then sends (303) the call information in a broadcast message across the LAN to the standby repeaters at the site. The processing then ends. It is understood that updates to ongoing calls are also broadcast to standby repeaters in the system to keep the standby repeaters current on all calls in the system.

Figure 4:
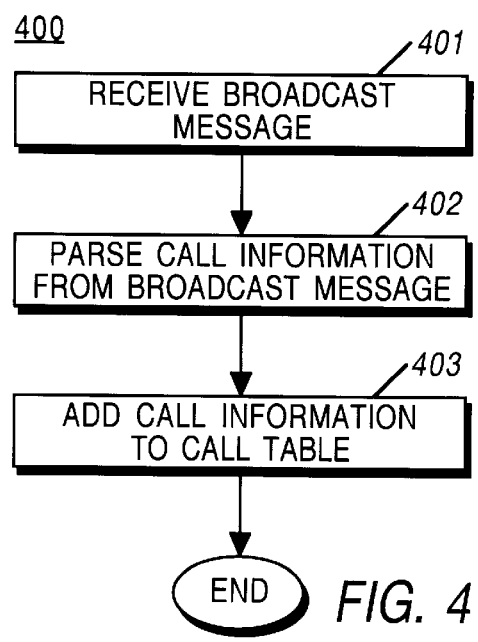
FIG. 4 is a flow diagram depicting operation of a standby repeater in accordance with the preferred embodiment of the present invention.

The repeaters not acting as the site controller, known as the standby repeaters, go through the processing depicted in FIG. 4. A standby repeater receives (401) the broadcast message from the site controller. The standby repeater then parses (402) the call information from the broadcast message to extract the call information. This call information is then added (403) to a call table existing at all repeaters, both at standby repeaters and at the site controller. The standby repeater then ends processing.

Upon failure of a site controller, a standby repeater will assume duties of the site controller. In current systems, the new site controller needs to ascertain the call information by polling all other repeaters across the LAN to determine the call information of each repeater. The new site controller then builds a call table by receiving this information. This processing, however, requires many messages to be sent across the LAN, thereby inundating the LAN with traffic and slowing down the transmission of messages across the LAN. This is especially true in systems comprising large numbers of standby repeaters. Using the present invention, however, allows the newly assigned site controller to immediately assume duties without having to poll other repeaters to ascertain their call information. This allows the new site controller to begin processing calls faster, and also prevents an inundation of traffic on the LAN, which can be disadvantageous for the system.

The present invention eliminates the problems associated with the prior art. Each standby repeater maintains a local call table, which eliminates the need to poll all other standby repeaters upon assuming duties of the site controller. By eliminating the polling of other repeaters, time is saved and the call information no longer needs to be sent across the LAN. By decreasing the number of message sent on the LAN, fewer messages are lost, thereby enhancing the reliability of the trunked communication system.

We claim:

1. At a communication system having a site controller and a plurality of standby repeaters, the site controller and the plurality of standby repeaters in communication via a local area network, a method of maintaining calls subsequent to a site controller failure, the method comprising the steps of:

at the site controller:
broadcasting, in a message, at least call information across the local area network, wherein the call information comprises a repeater-to-controller last call controlling command and a controller-to-repeater last call controlling command; and at the plurality of standby repeaters:
receiving the call information from the local area network;
building a call table, the call table comprising at least a portion of the call information; and
upon failure of the site controller, utilizing the call information contained in the call table to maintain calls.

2. A method of maintaining calls in accordance with claim 1, wherein the call information further comprises original outbound grant information.

3. A method of maintaining calls in accordance with claim 1, further comprising selecting one of the plurality of the standby repeaters to act as a new site controller.

4. A method of maintaining calls in accordance with claim 3, wherein the new site controller manages a plurality of resources at the communication system.

5. A method of maintaining calls in accordance with claim 3, wherein the new site controller processes calls at the communication system.

6. The method of claim 1, wherein the utilizing step further comprises the step of processing the repeater-to-controller last call controlling command and the controller-to-repeater last call controlling command to determine an assignment state and a phase of a call.

7. The method of claim 1, wherein the receiving step further comprises the step of parsing the call information from the message.

8. At a trunked communication system comprising a plurality of repeaters, having one of the plurality of repeaters acting as a site controller and a plurality of standby repeaters, the site controller and the plurality of standby repeaters in communication via a local area network, a method of maintaining calls subsequent to a site controller failure, the method comprising the steps of:

at the site controller:
broadcasting, in a message, at least call information across the local area network, wherein the call information comprises a repeater-to-controller last call controlling command and a controller-to-repeater last call controlling command; and at the plurality of standby repeaters:
receiving the call information from the local area network;
building a call table, the call table comprising at least a portion of the call information; and
upon failure of the site controller, utilizing the call information contained in the call table to maintain calls.

9. The method of claim 8, wherein the utilizing step further comprises the step of processing the repeater-to-controller last call controlling command and the controller-to-repeater last call controlling command to determine an assignment state and a phase of a call.

10. The method of claim 8, wherein the receiving step further comprises the step of parsing the call information from the message.

* * * * *